Figure 3:
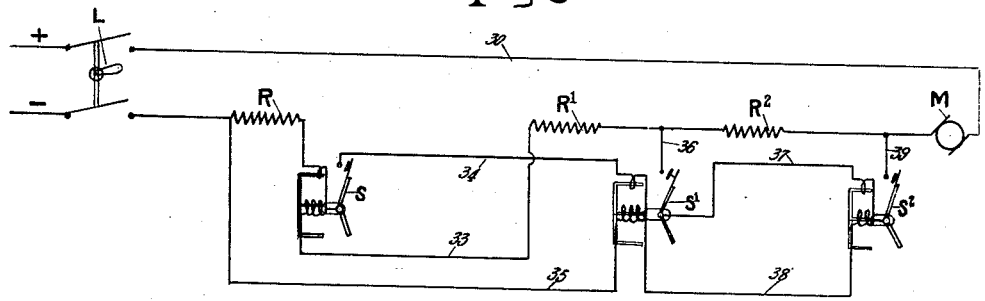

L. LARSEN.
ELECTROMAGNET.
APPLICATION FILED JAN. 2, 1918.
1,345,450.
Patented July 6, 1920.
2 SHEETS—SHEET 1.
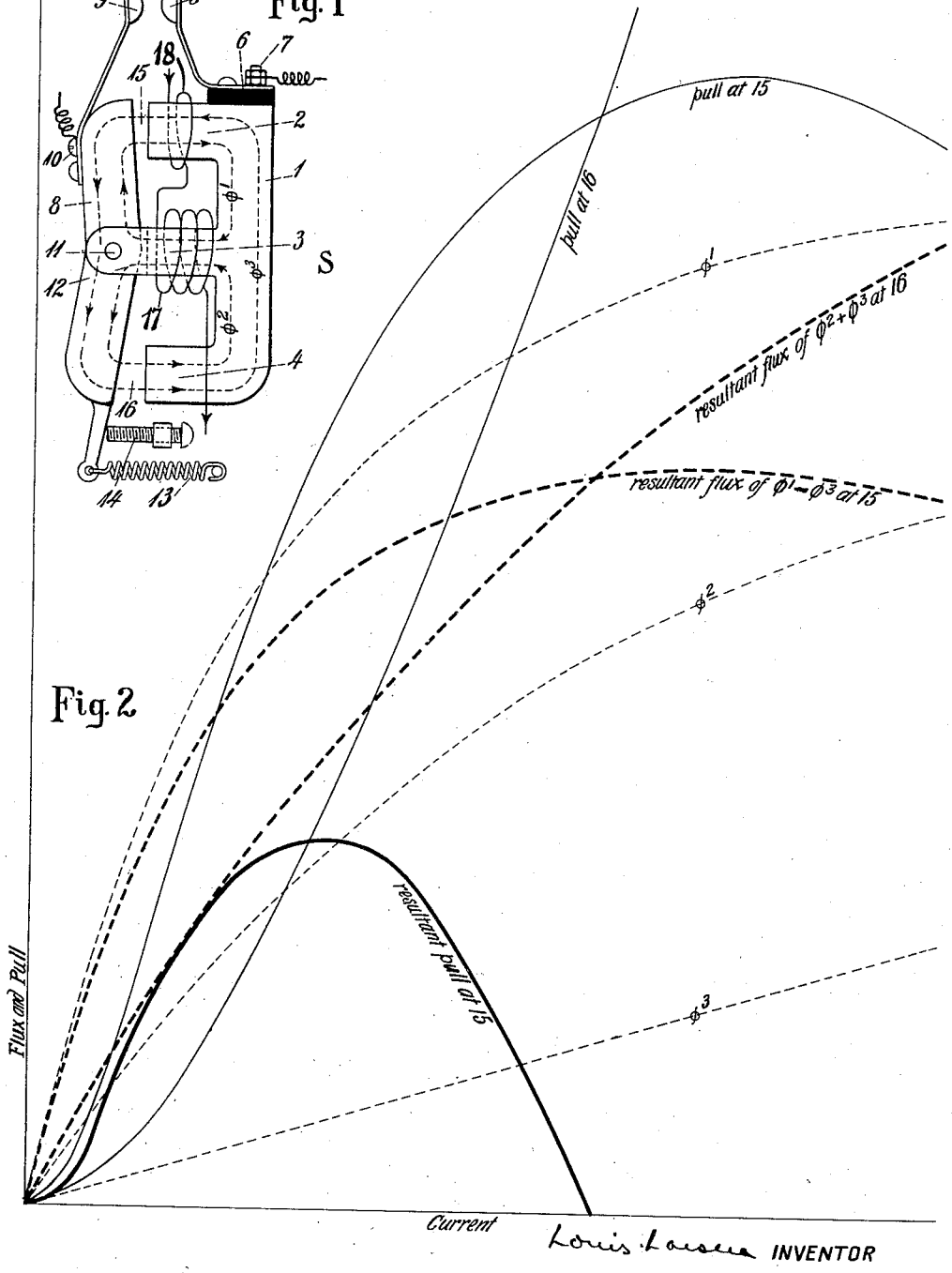

L. LARSEN.
ELECTROMAGNET.
APPLICATION FILED JAN. 2, 1918.

1,345,450.

Patented July 6, 1920.
2 SHEETS—SHEET 2.

Louis Larsen, Inventor
by Wm. B. Whitney
Attorney

UNITED STATES PATENT OFFICE.

LOUIS LARSEN, OF BROOKLYN, NEW YORK, ASSIGNOR TO SUNDH ELECTRIC COMPANY, OF NEW YORK, N. Y., A CORPORATION OF NEW YORK.

ELECTROMAGNET.

1,345,450.  Specification of Letters Patent.  Patented July 6, 1920.

Application filed January 2, 1918. Serial No. 209,842.

*To all whom it may concern:*

Be it known that I, LOUIS LARSEN, a citizen of the United States, residing in the city of New York, borough of Brooklyn, county of Kings, and State of New York, have invented a certain new and useful Electromagnet, of which the following is a specification.

My invention relates to an electromagnet of the type which is operative only when the exciting current which is supplied to its actuating coil falls within certain predetermined limits and which, because of such characteristics, has been principally employed for the operation of the switches of motor controllers where, their actuating coils being successively connected in series with the motor, the switches will remain open or inoperative so long as the current to the motor is above the predetermined safe value and thus provide a so-called current-limit system of control responsive to the electrical condition of the motor.

As heretofore constructed, the magnets of these switches have been actuated by a single series wound coil and the magnetic circuit, which includes the usual operative or pulling-in air-gap between one pole of the fixed magnetic member and one end either of a reciprocating core or of a pivoted armature and a substantially closed magnetic path from the opposite pole of the fixed magnetic member back to the movable core or armature, is provided with an additional return path or by-pass across an opposing or holding-out air-gap maintained between the pole of the fixed magnetic member and the end of the core or an arm of the pivoted armature opposite that at the pulling-in air-gap. The closed or main branch of the return magnetic circuit in effect short circuits the by-pass across the second or holding-out air-gap, and the parts are so proportioned and adjusted that this main path will be saturated with lines of force by comparatively small currents while it will require a heavy current to saturate the by-pass. Thus, when excited by a current materially higher than that for which the magnet is constructed and adjusted, enough of the magnetic flux will be forced through the by-pass and across the holding-out air-gap to prevent operation, but as the current falls, a larger and larger proportion of the total flux, which is decreasing in all parts of the magnetic circuit, will be carried over the shorter closed path until, the current having fallen within the limits predetermined, the weakening flux across the pulling-in air-gap will overcome the more rapidly reduced flux across the holding-out air-gap and actuate the switch.

Since the flux in the main and by-pass branches of the return magnetic circuit of these switches is in the same direction substantially the sum of the flux in both is acting at the pulling-in air-gap and at all times exerts a force tending to close the switch, being prevented from doing so only when opposed by a greater force at the holding-out air-gap in the by-pass. Consequently, the magnet is not positive in its operation. The pulling-in force is always greater the higher the current, and, therefore, although it will be overcome and the switch will be held open with extreme heavy currents, as the current drops and nears its predetermined critical or pulling-in value the switch is liable to close too soon. This is especially true when an alternating current is used to excite the magnet; so much so, that it has never been found possible to use this type of switch commercially for the control of alternating current circuits.

The object of my present invention is to provide a current-limit magnet which is positive in its action and is equally reliable both with alternating and direct current excitation.

I have discovered that by the use on a suitably constructed and adjusted magnet frame of two or more coils, a main coil and one or two subsidiary or compensating coils, suitably wound and placed, I can produce magnetic fluxes in opposite directions across one air-gap and all in one direction across the other air-gap, which fluxes are so responsive to changes in the value of the exciting current, alternating or direct alike, as to give a predominating closing force at the pulling-in air-gap whenever the current is below a predetermined critical value and with currents above such critical value, the force at the pulling-in air-gap remaining substantially stationary or even decreasing while the opposing force rapidly increases with an increase of current, an increasingly predominating holding-out force at the holding-out air-gap. I have thus obtained a magnet which is positive in its action and which operates in substantially the same way with alternating as with direct currents and is entirely reliable with both.

In its preferred form, my improved magnet comprises, briefly stated, a substantially E-shaped stationary core having three horizontally projecting legs, an armature of slightly elbow shape which is pivoted centrally on the outer end of the middle leg of the core to rock at one end against the upper leg or pole-piece and at the other end against the lower leg or pole-piece of the core, a main coil which is mounted upon the middle leg of the core, and either a single compensating coil connected in series with the main coil and wound similarly, which is mounted upon the upper pole-piece, or, the equivalent of such a single coil, two coils which are connected in series with the main coil and with each other and are mounted one upon the upper and the other upon the lower pole-piece, the upper coil being wound in the same direction as the main coil and the lower coil oppositely to both. Both the core and the armature are, of course, laminated in the usual manner when the magnet is intended for use with alternating currents. The middle leg of the core is made of smaller cross-section than the other two legs, preferably of one-half the area of each, in order that this leg may become easily saturated by the flux created by the main coil mounted thereon and so prevent the flux created by the compensating coil or coils from readily flowing through this shorter or shunt path and forcing it from the upper to the lower pole-piece and across both air-gaps. Where a single compensating coil is used, on the upper leg or pulling-in pole of the core, the ampere turns of the main and of this compensating coil are preferably in the proportion of five for the former to one of the latter; and when two compensating coils are used the number of ampere turns given to the single coil, is divided between the two. And, finally, the armature is so shaped and adjusted that, when the magnet is inoperative and in normal open position, there will be a relatively short pulling-in air-gap at the upper pole-piece and a somewhat longer holding-out air-gap at the bottom pole-piece. The proportions and adjustments of the several parts may be varied widely, but those above given are the ones which, at present, have been found to produce the best results.

The construction and performance of a switch operated by a magnet having the characteristics described, and also certain applications of the switch to control systems both for direct and for alternating current motors, are shown in the accompanying drawings, in which—

Figure 4:
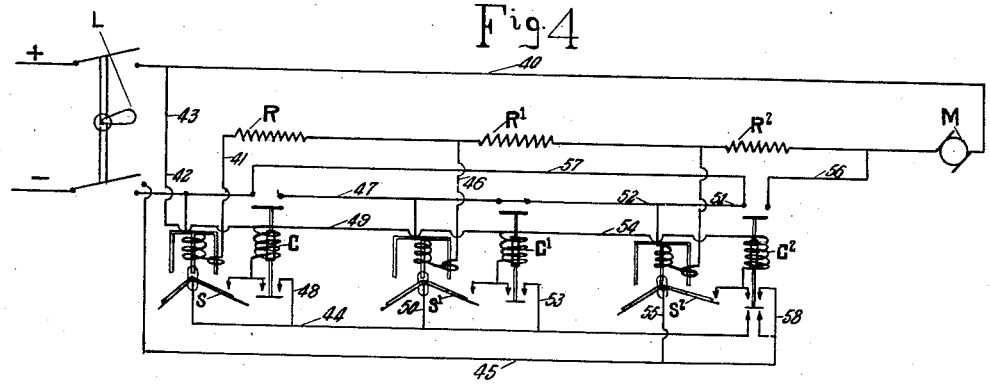

Figure 1 is a view of the switch in side elevation, the main coil and single compensating coil being shown diagrammatically for the sake of clearness and the flux paths indicated by dotted lines; Fig. 2, a diagram showing the characteristic flux and pull curves of the switch of Fig. 1 under varying exciting currents whether alternating or direct; Fig. 3, a diagram illustrating the application of the switch to a direct or single phase alternating current system of motor control; Fig. 4, a diagram illustrating a different application of the switch to a direct or single phase alternating current system of motor control; and Fig. 5, a diagram illustrating one application of the switch to a polyphase alternating current system of motor control.

The same reference characters indicate like parts throughout the several figures of the drawings.

Referring first to Fig. 1, S indicates the switch as a whole. The stationary magnetic core 1, having three horizontal legs 2, 3, and 4, is mounted upon the usual base of insulating material (not shown) or in any other suitable manner, and above it is mounted the stationary contact member 5 which, as shown, is secured to an insulating block 6 fixed to the top of the upper leg of the core and is provided with a binding post 7 by which it is connected with one terminal of the electric circuit which the switch is used to control. The armature 8, which carries at its upper end the coöperating movable contact 9 provided with a suitable binding screw 10 for connecting it to the other circuit terminal, is pivoted at 11 between two plates 12 (only one of which is shown) fixed to the opposite sides of the middle leg of the core. As here illustrated, the switch is moved to and normally held in open position by a spring 13 which draws the lower end of the armature back against an adjustable stop 14, which by its position determines the maximum length of the short pulling-in air-gap 15 at the upper, and the minimum length of the longer holding-out air-gap 16 at the bottom, of the magnet. This stop is preferably so adjusted as to give to the holding-out air-gap a length several—say, five—times that of the pulling-in air-gap, although, as stated, the proportionate length of the two may be varied widely. The main actuating coil 17, wound upon the middle leg 3 of the core, produces when energized an upward flux $\varphi^1$ across the pulling-in air-gap 15 and a downward flux $\varphi^2$ across the holding-out air-gap and has ampere turns—three hundred, for example—sufficient to easily saturate the middle leg of the core with comparatively small currents. The compensating coil 18, preferably of one-fifth the ampere turns of the main coil, is wound upon the upper pole-piece of the magnet so as to give a flux $\varphi^3$ across the upper or pulling-in air-gap in the opposite direction to the flux $\varphi^1$, and this flux, because of the saturation of the middle leg by the main coil, is for the most part forced down to the lower end of the magnet, across the holding-out air-gap in the same direction as the flux $\varphi^2$, and thence back to the upper end of the magnet.

Thus, the closing pull at the upper air-gap is produced by the resultant of the two opposite fluxes $\varphi^1$ and $\varphi^3$, that is to say, $\varphi^1-\varphi^3$, while the holding-out pull at the lower air-gap is produced by the sum of the coöperating fluxes $\varphi^2$ and $\varphi^3$, or $\varphi^2+\varphi^3$. With currents in excess of the predetermined critical value, as appears from the characteristic curves (Fig. 2) given by both alternating and direct currents alike, the values of both fluxes $\varphi^2$ and $\varphi^3$ rise, because of the low flux densities due to the length of the lower air-gap, and give a resultant flux, and consequent holding-out pull, which increases rapidly with an increase of current; whereas, the closing pull at the upper air-gap, unlike that of the old series magnets in which the pulling-in air-gap is always made longer than the holding-out air-gap, remains practically stationary or even decreases in value, since the flux $\varphi^1$ does not rise materially and is opposed by the rising value of the flux $\varphi^3$. Hence, the higher the current, the more strongly is the switch held open and inoperative. As the current in the coils falls to and passes below the critical value, however the situation changes. For an instant only the closing and holding-out pulls balance each other. Then, as the flux $\varphi^1$ dies down less rapidly than the opposing flux $\varphi^3$, the gradually weakening closing pull at the upper air-gap quickly rises in value above the more rapidly weakening fluxes and holding-out pull at the lower air-gap and closes the switch. The result is that the switch is positively and firmly closed whenever the current, whether alternating or direct, falls slightly below the value predetermined, but is positively prevented from operating by a current slightly in excess of such value and is more securely locked in inoperative position the heavier and more dangerous the current.

In Fig. 3, there is illustrated a system of control for either a direct or single phase alternating current motor in which three of my new electromagnetic switches S, S$^1$, S$^2$ are used as contactors to directly control as many sections of starting resistance R, R$^1$, R$^2$ in the armature circuit of the motor M. The operation of the controller in the starting of the motor is as follows: On closing the line switch L, current flows from the positive main over wire 30 to and through the motor and thence back to the negative main through all of the resistance and both coils of the switch S. The switch is held open so long as the current thus admitted to the motor is above the predetermined safe value, but, as the motor speeds up and generates counter-electromotive force, the current is reduced in volume and the switch is closed. Thereupon current flows from the motor back to the negative main through the resistances R$^2$ and R$^1$, over wire 33, through the main coil only and across the closed contacts of switch S, over wire 34, through both coils of switch S$^1$, and over wire 35, short-circuiting the resistance R and the compensating coil of switch S. The switch S$^1$, which in turn is held inoperative until the increased current admitted to the motor by the cutting out of the resistance has again been reduced by a further acceleration of the motor, on closing establishes a return circuit from the motor to the negative main which includes the resistance R$^2$, wire 36, closed contacts of switch S$^1$, wire 37, both coils of switch S$^2$, wire 38, main coil of switch S$^1$, and wire 35, thereby short-circuiting resistance R$^1$ and the compensating coil of switch S$^1$ and the main coil of switch S. Finally, switch S$^2$ closes, after being held open until the motor has sufficiently accelerated, and short-circuits the last section of resistance R$^2$ and its own compensating coil by establishing a return circuit from the motor by wire 39, closed contacts and main coil of switch S$^2$, wire 38, main coil of switch S$^1$, and wire 35 to the negative main.

As illustrated in Fig. 4, the switches are used as relays to control contactor switches which in turn short-circuit the sections of starting resistance. The successive circuits automatically established in the operation of the device, on the closing of the line switch L, are as follows: The first circuit includes wire 40, armature of motor M, resistances R$^2$, R$^1$, R, wire 41, both coils of switch S, and wire 42. This starts the motor with the three sections of resistance and both coils of relay S in series with its armature. When relay S, thus energized, becomes operative it closes a shunt circuit, from the positive to the negative main, by wire 43, magnet coil of contactor C, closed contacts of relay S, wire 44, normally closed lower contacts of contactor C$^2$, and wire 45, which actuates the contactor C. The closing of the upper contacts of this contactor short-circuits the resistance R and both coils of relay S by connecting resistance R$^1$ with the negative main by wire 46, both coils of relay S$^1$, and wire 47, while its lower contacts establish a new or holding circuit for its coil by connecting the lower end of the coil to wire 44 over wire 48. Relay S$^1$, being now energized, closes when conditions permit and places the magnet coil of contactor C$^1$ in the shunt circuit in parallel with the coil of contactor C by connecting wire 43 to wire 44 over wires 49 and 50. Contactor C$^1$ is thereupon actuated, its upper contacts short-circuiting resistance R$^1$ and both coils of relay S$^1$ over wire 51, through both coils of relay S², and over wire 52 to wire 47 and its lower contacts establishing a new holding circuit for its coil by connecting the lower end of the coil to wire 44 over wire 53. The closing of relay S², in turn, by connecting wire 49 to wire 45 over wires 54 and 55 and thereby placing the magnet coil of contactor C² in parallel with the coils of the two other contactors, causes the actuation of this third contactor, which, at its upper contacts, short-circuits the three resistances and both coils of the three relays over wires 56 and 57 and at its lower contacts opens the connection between wires 44 and 45 and thereby breaks the circuits through the coils of contactors C and C¹ and establishes a holding circuit for itself by connecting the lower end of the coil to wire 45 over wire 58. The motor has now been brought to a condition of full speed, with all of the resistance, the coils of the two contactors C and C¹, and both coils of the three relays cut out of circuit.

Figure 5:
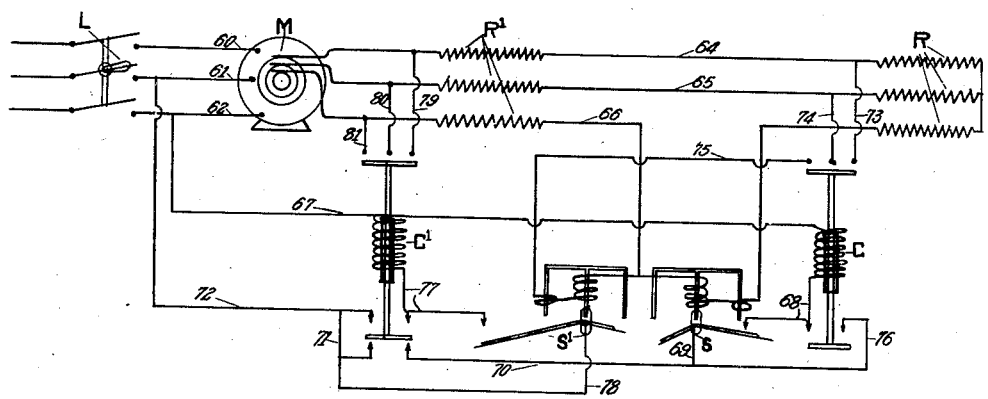

The switches are also used as relays in the controller illustrated in Fig. 5, for alternating currents only. The closing of the line switch L connects the three mains to the three wires 60, 61, 62 of the primary of the motor M, which starts the motor with resistances R and R¹ in each of the three wires 64, 65, 66 of its secondary or rotor circuit and with both coils of the relay S in series in the wire 66. When the relay S, thus energized, is permitted to close, it establishes a circuit, shunting two of the primary wires 62 and 61, which includes wire 67, coil of contactor C, wire 68, closed contacts of relay S, wires 69 and 70, the normally closed contacts on the lower side of the lower contact bar of contactor C¹, and wires 71 and 72. The contactor C is now actuated and its main contacts, in closing, connect together the three wires of the secondary circuit over the wires 73, 74, and 75, thus short-circuiting the resistance R and both coils of the relay S and connecting both coils of the relay S¹ in series with the wire 66, while its lower contacts establish a new holding circuit by connecting wire 68 to wire 70 over wire 76. Finally, the relay S¹ is actuated and places the coil of contactor C¹ in parallel with that of contactor C by connecting wire 67 to wire 72 over wires 77, 78, and 71 and thereby causes the actuation of contactor C¹, which, at its upper contacts, short-circuits resistance R¹ and both coils of relay S¹ by connecting together the wires of the secondary circuit over wires 79, 80, 81 and, at its lower contacts, opens the connection between wires 70 and 71, thereby cutting the coil of contactor C out of circuit, and establishes a new holding circuit for itself by connecting wire 77 directly to wire 72. This completes the operation of starting the motor.

While I have shown and described my invention as embodied in a specific type of electromagnet for actuating an electric switch and have illustrated the application of switch to alternating and direct current systems of motor control, it should be understood that I do not limit myself to any type of magnet or to the details of construction thereof or to any theory of operation, except as set forth in the annexed claims.

What I claim as new, and desire to secure by Letters Patent, is—

1. An electromagnet comprising a magnetizable member and means for producing therein from the same electric current magnetic forces which are of relative values varying with changes in the exciting current and are counteracting at one pole of said member.

2. An electromagnet comprising a magnetizable member and means for producing at one pole thereof a flux which remains at approximately uniform strength as the exciting currents rise above a predetermined critical value and falls relatively slowly as the exciting currents fall below such critical value.

3. An electromagnet comprising a magnetizable member providing two poles and means for producing therein magnetic fluxes which are counteracting at one and cumulative at the other of said poles.

4. An electromagnet comprising a magnetizable member providing two poles and means for producing therein main and subsidiary magnetic fluxes which are counteracting at one and cumulative at the other of said poles.

5. An electromagnet comprising a movable magnetizable member, a magnetic circuit including said movable member and an air-gap adjacent to each end thereof, and means for producing from similarly varying currents of electricity magnetic fluxes which at one air-gap are the resultant of counteracting magnetic forces and at the second air-gap are the resultant of cumulative magnetic forces.

6. An electromagnet comprising a movable magnetizable member, a magnetic circuit including said movable member and air-gaps of different lengths adjacent to its two ends respectively, and means for producing magnetic fluxes which at the smaller air-gap are due to counteracting magnetic forces and at the larger air-gap are due to cumulative magnetic forces.

7. An electromagnet comprising a movable magnetizable member, a magnetic circuit including said movable member and air-gaps of different lengths adjacent to its two ends respectively, and means for producing from the same source of electric energy main and auxiliary fluxes which are counteracting at one and cumulative at the other of said air-gaps.

8. An electromagnet comprising a movable magnetizable member, a magnetic circuit including said movable member and an air-gap adjacent to each of its two ends, means for adjusting the length of one air-gap, and means for producing magnetic fluxes which are counteracting at one and cumulative at the other air-gap.

9. An electromagnet comprising a movable magnetizable member, a magnetic circuit including the movable member and an air-gap adjacent to each of its ends, means for adjusting the position of the movable member to change the relative lengths of the two air-gaps, and means for producing magnetic fluxes which are counteracting at one and cumulative at the other air-gap.

10. An electromagnet comprising stationary and movable magnetizable members operatively related to form a magnetic circuit having when the magnet is in normal open position a relatively short pulling-in air-gap adjacent to one end and a longer holding-out air-gap adjacent to the other end of the movable member and means for producing magnetic fluxes which are counteracting at the pulling-in air-gap and cumulative at the holding-out air-gap.

11. An electromagnet comprising stationary and movable magnetizable members operatively related to form a magnetic circuit having when the movable member is in normal open position a pulling-in air-gap adjacent to one and a longer holding-out air-gap adjacent to the other of its two ends and means for producing from the same electric currents both a main magnetic flux and subsidiary fluxes which at the pulling-in air-gap partially counteract the main flux and at the holding-out air-gap are cumulative therewith.

12. An electromagnet comprising stationary and movable magnetizable members operatively related to form a magnetic circuit having when the movable member is in normal open position a pulling-in air-gap adjacent to one of its ends and a longer holding-out air-gap adjacent to its other end and means for producing from similarly varying currents of electricity a magnetic flux across both air-gaps which at the pulling-in air-gap is the resultant of a main and a counteracting subsidiary flux and at the holding-out air-gap is the resultant of the main and a concurrent subsidiary flux.

13. An electromagnet comprising stationary and movable magnetizable members operatively related to form a magnetic circuit having when the movable member is in normal open position a pulling-in air-gap adjacent to one of its ends and a longer holding-out air-gap adjacent to its other end and means for producing from similarly varying currents of electricity magnetic fluxes of flux densities proportioned approximately as the lengths of the two air-gaps which are counteracting at the pulling-in and cumulative at the holding-out air-gap.

14. An electromagnet comprising stationary and movable magnetizable members operatively related to form a magnetic circuit having when the movable member is in normal open position a short pulling-in air-gap adjacent to one of its ends and a longer holding-out air-gap adjacent to its other end, means for adjusting the open position of the movable member to change the relative lengths of both air-gaps, and means for producing from the same source of electricity both main and secondary fluxes which at the pulling-in air-gap are counteracting and at the holding-out air-gap are cumulative.

15. An electromagnet comprising stationary and movable magnetizable members operatively related to form a magnetic circuit having when the movable member is in normal open position an air-gap adjacent to each end of the movable member and a plurality of magnet coils so wound that they will produce when energized magnetic fluxes across both air-gaps which, with the exciting currents rising above a predetermined critical value, will give a substantially uniform pull at the pulling-in air-gap and a rapidly increasing pull at the holding-out air-gap, and, as the current falls below such critical value, will give a relatively slowly decreasing pull at the pulling-in air-gap and a more rapidly decreasing pull at the holding-out air-gap.

16. An electromagnet comprising stationary and movable magnetizable members operatively related to form a magnetic circuit having when the movable member is in normal open position a short pulling-in air-gap adjacent to one of its ends and a longer holding-out air-gap adjacent to its other end and a plurality of magnet coils adapted to produce in the magnetic circuit fluxes which, with exciting currents above a predetermined critical value, will give at the pulling-in air-gap a substantially uniform pull and at the holding-out air-gap a pull rapidly increasing with increase of current, and, as the exciting currents fall below such predetermined critical value, will give a relatively slowly decreasing pull at the pulling-in air-gap and a more rapidly decreasing pull at the holding-out air-gap.

17. An electromagnet comprising stationary and movable magnetizable members operatively related to form a magnetic circuit having when the movable member is in normal open position a pulling-in air-gap adjacent to one of its ends and a holding-out air-gap adjacent to its other end, a plurality of magnet coils adapted to produce in the magnetic circuit fluxes which, with exciting currents above a predetermined value, will give at the pulling-in air-gap a substantially uniform pull and at the holding-out air-gap a pull increasing with the rise of the current, and, as the current falls below such predetermined value, will give a relatively slowly decreasing pull at the pulling-in air-gap and a more rapidly decreasing pull at the holding-out air-gap, and means for adjusting the parts to regulate the flux values.

18. An electromagnet comprising stationary and movable magnetizable members cooperatively related through an air-gap adjacent to each end of the movable member when the latter is in normal open position, a magnetizable member connecting the stationary and movable members intermediate the two air-gaps, a main magnet coil mounted upon the connecting member, and a compensating coil mounted upon the stationary member adjacent to one air-gap and so wound as to produce a flux which at said air-gap will partially counteract the flux produced by the main coil.

19. An electromagnet comprising stationary and movable magnetizable members operatively related to provide when the movable member is in normal open position an air-gap adjacent to each of its ends, means for adjusting the open position of the movable member to regulate the relative values of the two air-gaps, a magnetizable member bridging the stationary and movable members intermediate the two air-gaps, and two magnet coils mounted one upon the bridging member and the other on one pole of the stationary member to produce counteracting fluxes at the air-gap adjacent to the second coil.

20. An electromagnet comprising stationary and movable magnetizable members operatively related so as to provide when the movable member is in normal open position a short pulling-in air-gap adjacent to one of its ends and a longer holding-out air-gap adjacent to its other end, a magnetizable member of smaller sectional area bridging the stationary and movable members intermediate the two air-gaps, and main and compensating magnet coils connected together in series and mounted the main coil upon the bridging member and the compensating coil upon the stationary member adjacent to the pulling-in air-gap and so wound as to produce counteracting fluxes at said air-gap.

21. An electromagnet comprising stationary and movable magnetizable members operatively related to provide when the movable member is in normal open position a relatively short pulling-in air-gap adjacent to one of its ends and a longer holding-out air-gap adjacent to its other end, a magnetizable member of smaller sectional area bridging the stationary and movable members intermediate the two air-gaps, a main magnet coil mounted upon the bridging member, and a compensating coil in series with the main coil and having ampere turns proportioned to those of the main coil substantially as the length of the pulling-in air-gap is to that of the holding-out air-gap, so mounted upon the stationary member adjacent to the pulling-in air-gap as to produce at said air-gap a flux to partially counteract the flux produced by the main coil.

22. An electromagnet comprising a substantially E-shaped stationary core with middle leg of smaller sectional area than the upper and lower legs, an armature of slightly elbow shape pivoted centrally to the middle leg of the core with its two ends in operative relationship with the upper and lower legs of the core, an adjustable stop for holding the armature in normal open position so as to provide a short pulling-in air-gap between its upper end and the upper leg of the core and a longer air-gap between its lower end and the lower leg of the core, a main coil wound upon the middle leg of the core having ampere turns sufficient to easily saturate the middle leg of the core, and a compensating coil in series with the main coil and having fewer ampere turns so mounted upon the upper leg of the core as to produce at the pulling-in air-gap a flux to partially counteract that produced by the main coil.

23. In an electromagnetic switch, a stationary switch contact, a coöperating movable switch contact, a movable member of magnetizable material carrying at one of its ends the movable contact, a magnetic circuit including the movable member and having when said member is in normal open position a pulling-in air-gap adjacent to the end carrying the movable contact and a holding-out air-gap adjacent to its other end, and means for producing from the electric current in the circuit controlled by the switch magnetic fluxes of different values which are counteracting at the pulling-in and cumulative at the holding-out air-gap.

24. In an electromagnetic switch, coöperating stationary and movable switch contacts, stationary and movable magnetizable members, the latter carrying the movable contact, operatively related to form a magnetic circuit having when the movable member is in normal open position pulling-in and holding-out air-gaps of different lengths, and means for producing from the current in the circuit controlled by the switch main and secondary fluxes which at one of the air-gaps are counteracting.

25. In an electromagnetic switch, coöperating stationary and movable switch contacts, a movable magnetizable member carrying at its upper end the movable switch contact, a stationary magnetizable member so operatively related to the movable member as to provide when the latter is in normal open position a pulling-in air-gap adjacent to its upper end and a holding-out air-gap adjacent to its lower end, a magnetizable bridging member connecting the movable and stationary members intermediate the two air-gaps, and a main magnet coil and a smaller compensating magnet coil connected in series with each other and with the circuit controlled by the switch so mounted, the main coil upon the bridging member and the compensating coil upon the stationary member adjacent the pulling-in air-gap, as to produce counteracting fluxes at said air-gap.

26. In a current-limit switch for the control of alternating current circuits, coöperating stationary and movable switch contacts, a movable magnetizable member carrying the movable contact, a magnetic circuit including the movable member and having when the switch is in normal open position a relatively short pulling-in air-gap adjacent to the upper end and a longer holding-out air-gap adjacent to the lower end of the movable member, a plurality of coils energized by current in the circuit controlled by the switch and adapted to produce magnetic fluxes of different values which are counteracting at the pulling-in air-gap.

27. In a current-limit switch for the control of alternating current circuits, coöperating stationary and movable switch contacts, coöperating stationary and movable magnetizable members, the latter carrying the movable contact, forming a magnetic circuit having when the movable member is in open position a pulling-in air-gap adjacent to one of its ends and a holding-out air-gap adjacent to its other end, a magnetizable member connecting the stationary and fixed members and bridging the magnetic circuit intermediate the two air-gaps, a main magnet coil in series with the circuit controlled by the switch mounted upon the bridging member, and a smaller compensating coil also in series with the circuit controlled by the switch so associated with the magnetic circuit as to produce secondary fluxes which at the pulling-in air-gap partially counteract and at the holding-out air-gap are cumulative with the flux produced by the main coil.

28. In a current-limit switch for the control of alternating current circuits, coöperating stationary and movable switch contacts coöperating stationary and movable magnetizable members, the latter carrying at its upper end the movable contact, operatively related to form a magnetic circuit having when the movable member is in open position a relatively short pulling-in air-gap adjacent to its upper end and a longer holding-out air-gap adjacent to its lower end, a magnetizable member of smaller sectional area connecting the stationary and movable members and bridging the magnetic circuit intermediate the two air-gaps, and a plurality of magnet coils in series with the circuit controlled by the switch so associated with the magnetic circuit as to produce fluxes of different values which at the pulling-in air-gap are counteracting and at the holding-out air-gap are cumulative.

29. In a current-limit switch for the control of alternating current circuits, coöperating stationary and movable switch contacts, a movable magnetizable member carrying the movable contact, a magnetic circuit which includes the movable member and two air-gaps of adjustably different lengths, a pulling-in air-gap adjacent to one end and a holding-out air-gap adjacent to the other end of the movable member, and means for producing from the current in the circuit controlled by the switch magnetic fluxes in the magnetic circuit which, with increase of currents in the control circuit above a predetermined critical value, will give a substantially uniform pull at the pulling-in air-gap and a rising pull at the holding-out air-gap, and, as the current in the control circuit falls below such critical value, will give a relatively slowly decreasing pull at the pulling-in air-gap and a more rapidly decreasing pull at the holding-out air-gap.

LOUIS LARSEN.